US008219388B2

(12) United States Patent
Kaneko et al.

(10) Patent No.: US 8,219,388 B2
(45) Date of Patent: Jul. 10, 2012

(54) USER VOICE MIXING DEVICE, VIRTUAL SPACE SHARING SYSTEM, COMPUTER CONTROL METHOD, AND INFORMATION STORAGE MEDIUM

(75) Inventors: Hiromasa Kaneko, Minato-ku (JP); Masaki Takeuchi, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1189 days.

(21) Appl. No.: 11/916,689

(22) PCT Filed: Jun. 7, 2006

(86) PCT No.: PCT/JP2006/311431
§ 371 (c)(1),
(2), (4) Date: Dec. 6, 2007

(87) PCT Pub. No.: WO2006/132276
PCT Pub. Date: Dec. 14, 2006

(65) Prior Publication Data
US 2010/0145701 A1    Jun. 10, 2010

(30) Foreign Application Priority Data
Jun. 8, 2005   (JP) ................................. 2005-167803

(51) Int. Cl.
*G10L 19/00*   (2006.01)
*G10L 11/00*   (2006.01)
*G06F 15/00*   (2006.01)
*G06F 17/00*   (2006.01)

(52) U.S. Cl. ........................... 704/201; 704/200; 463/42

(58) Field of Classification Search ........................ None
See application file for complete search history.

(56) References Cited

U.S. PATENT DOCUMENTS
5,026,051 A * 6/1991 Lowe et al. ..................... 463/35
(Continued)

FOREIGN PATENT DOCUMENTS
JP            2000-244487 A       9/2000
(Continued)

OTHER PUBLICATIONS

Boustead et al. "Comparison of delivery architectures for immersive audio in crowded networked games". Proceedings of the 14th international workshop on Network and operating systems support for digital audio and video.*

(Continued)

*Primary Examiner* — Talivaldis Ivars Smits
*Assistant Examiner* — Jesse Pullias
(74) *Attorney, Agent, or Firm* — Sughrue Mion, PLLC

(57) ABSTRACT

A sensation of presence of voice chat in a virtual space is enhanced. A user speech synthesizer used in a virtual space sharing system where information processing devices share the virtual space. The user speech synthesizer comprises a speech data acquiring section (60) for acquiring speech data representing a speech uttered by the user of one of the information processing devices, an environment sound storage section (66) for storing an environment sound associated with one or more regions defined in the virtual space, a region specifying section (64) for specifying a region corresponding to the user in the virtual space, and an environment sound synthesizing section (68) for acquiring the environment sound associated with the specified region from the environment sound storage section (66), combining the acquired environment sound and the speech data and synthesizing synthesized speech data.

19 Claims, 9 Drawing Sheets

U.S. PATENT DOCUMENTS

| | | | | |
|---|---|---|---|---|
| 5,556,107 A * | 9/1996 | Carter | | 463/35 |
| 5,586,937 A * | 12/1996 | Menashe | | 463/41 |
| 5,736,982 A * | 4/1998 | Suzuki et al. | | 715/706 |
| 5,947,825 A * | 9/1999 | Horstmann et al. | | 463/42 |
| 6,106,399 A * | 8/2000 | Baker et al. | | 463/42 |
| 6,241,612 B1 | 6/2001 | Heredia | | |
| 6,784,901 B1 * | 8/2004 | Harvey et al. | | 715/757 |
| 6,880,168 B2 * | 4/2005 | Maehiro | | 725/97 |
| 7,371,175 B2 * | 5/2008 | Gilboy et al. | | 463/35 |
| 7,491,123 B2 * | 2/2009 | Smith | | 463/35 |
| 7,828,657 B2 * | 11/2010 | Booth | | 463/35 |
| 2002/0094865 A1 * | 7/2002 | Araki et al. | | 463/35 |
| 2003/0216178 A1 * | 11/2003 | Danieli et al. | | 463/35 |
| 2005/0256877 A1 * | 11/2005 | Searles et al. | | 707/10 |

FOREIGN PATENT DOCUMENTS

| | | |
|---|---|---|
| JP | 2001-204973 A | 7/2001 |
| JP | 2001-334065 A | 12/2001 |
| JP | 2002-176510 A | 6/2002 |
| JP | 2004-267433 A | 9/2004 |

OTHER PUBLICATIONS

Canadian Office Action corresponding to Canadian Patent Application No. 2,609,743, dated Mar. 8, 2010.

* cited by examiner

FIG.7

| REGION ID | SOUND ID |
|---|---|
| A1 | S1 |
| A2 | S2 |
| A3 | S3 |
| A4 | S4 |
| ⋮ | ⋮ |

USER VOICE MIXING DEVICE, VIRTUAL SPACE SHARING SYSTEM, COMPUTER CONTROL METHOD, AND INFORMATION STORAGE MEDIUM

TECHNICAL FIELD

The present invention relates to a user voice mixing device, a virtual space sharing system, a computer control method, and an information storage medium, and more particularly, to a technology of mixing a voice generated at a remote site in a virtual space so as to make the voice realistic.

BACKGROUND ART

There has been known a system in which users can have voice chats with one another in a virtual space. This system is used in combination with, for example, a network game, so as to make the game more interesting. Conventionally, in order to make the voice chat in the virtual space more realistic, there has been a system as disclosed in Patent Document 1 below, in which voice data is distributed after the mixing has been completed, the mixing including sound image localization processing corresponding to a positional relation between speakers in the virtual space.

[Patent Document 1] Japanese Patent Application Laid-open No. 2000-244487

DISCLOSURE OF THE INVENTION

Problem to be Solved by the Invention

However, conversations in the virtual space through a transceiver or a telephone, that is, voices in the voice chat performed between remote sites, do not change regardless of the varying positional relations between the calling parties. For this reason, according to the above-mentioned conventional technology, it has not been possible to make the voice realistic enough that players in a game are carried away from the real world to be absorbed in a virtual world.

The present invention has been made in view of the above-mentioned problem, and it is an object of the present invention to provide a user voice mixing device, a virtual space sharing system, a computer control method, and an information storage medium, which are capable of mixing a voice so as to make the voice realistic.

Means for Solving the Problem

In order to solve the above-mentioned problem, the present invention provides a user voice mixing device used in a virtual space sharing system in which a plurality of information processing devices share a virtual space, the user voice mixing device being characterized by including: a voice data acquiring means for acquiring voice data representing a voice uttered by a user of one of the plurality of information processing devices; an environmental sound storing means for storing an environmental sound in association with each of one or more regions defined in the virtual space; a region specifying means for specifying a region corresponding to the user in the virtual space; and an environmental sound mixing means for creating mixed voice data by acquiring an environmental sound associated with a region specified by the region specifying means from the environmental sound storing means and mixing the acquired environmental sound and the voice data.

Further, the present invention provides a control method for a computer (for example, a home-use game machine, an arcade game machine, a mobile phone, a portable game machine, a personal digital assistant (PDA), a personal computer, and a server computer, hereinafter collectively referred to as computer) used in a virtual space sharing system in which a plurality of information processing devices share a virtual space, the control method for a computer being characterized by including: a voice data acquiring step of acquiring voice data representing a voice uttered by a user of one of the plurality of information processing devices; a region specifying step of specifying a region corresponding to the user in the virtual space; and an environmental sound mixing step of creating mixed voice data by acquiring, with reference to an environmental sound storing means storing environmental sounds in association with each of one or more regions defined in the virtual space, an environmental sound associated with a region specified in the region specifying step and mixing the acquired environmental sound and the voice data.

Still further, the present invention provides an information storage medium storing a program for causing a computer to function, the computer being used in a virtual space sharing system in which a plurality of information processing devices share a virtual space, the program causing the computer to function as: a voice data acquiring means for acquiring voice data representing a voice uttered by a user of one of the plurality of information processing devices; an environmental sound storing means for storing an environmental sound in association with each of one or more regions defined in the virtual space; a region specifying means for specifying a region corresponding to the user in the virtual space; and an environmental sound mixing means for creating mixed voice data by acquiring an environmental sound associated with a region specified by the region specifying means from the environmental sound storing means and mixing the acquired environmental sound and the voice data. The information storage medium may include a computer-readable medium such as a CD-ROM, a DVD-ROM, or a ROM cartridge.

Yet further, the present invention provides a virtual space sharing system in which a plurality of information processing devices share a virtual space, the virtual space sharing system being characterized by including: a voice data acquiring means for acquiring voice data representing a voice uttered by a user of one of the plurality of information processing devices; an environmental sound storing means for storing an environmental sound in association with each of one or more regions defined in the virtual space; a region specifying means for specifying a region corresponding to the user in the virtual space; and an environmental sound mixing means for creating mixed voice data by acquiring an environmental sound associated with a region specified by the region specifying means from the environmental sound storing means and mixing the acquired environmental sound and the voice data.

According to the present invention, the plurality of information processing devices share the virtual space. The virtual space may include a game space which is shared by a plurality of users in a network game system. Then, an environmental sound is stored in association with each of one or more regions defined in the virtual space. The environmental sound includes a sound associated with the corresponding region in the virtual space. According to the present invention, chirps of birds may be stored in association with a mountainous area, traffic noises (such as traveling sounds of vehicles or the sounds of vehicle horns) may be stored in association with a city, or a sound of waves may be stored in association with a seashore, the mountainous area, the city, and the seashore being defined in the virtual space. When one of the regions is specified in the virtual space, the region corresponding to a user of one of the plurality of information processing devices, an environmental sound corresponding to the region is acquired from the environmental sound storage means, and the acquired environmental sound is mixed with the voice data representing the voice uttered by the user.

According to the present invention, a voice uttered by a user can be reproduced together with an environmental sound associated with a region corresponding to the user in the virtual space. Accordingly, it is possible to mix a voice generated at a remote site in the virtual space so as to make the voice realistic.

According to an aspect of the present invention, the user voice mixing device is characterized in that the user voice mixing device is communicably connected to the plurality of information processing devices through a communication network, the voice data acquiring means receives the voice data from the one of the plurality of information processing devices, the user voice mixing device further includes a mixed voice data transmitting means for transmitting the mixed voice data to another one of the plurality of information processing devices, and the other one of the plurality of information processing devices receives the mixed voice data and outputs a voice represented by the mixed voice data. In this manner, in the information processing devices including an information processing device on a transmitter side and an information processing device on a receiver side which are connected through a communications network, a voice uttered by a user on the transmitter side can be reproduced together with an environmental sound associated with a region corresponding to the user in the virtual space. Accordingly, it is possible to transmit a voice generated at a remote site in a virtual space to the receiver side with reality.

According to another aspect of the present invention, the user voice mixing device is characterized by further including a transfer destination identification data receiving means for receiving, from the one of the plurality of information processing devices, transfer destination identification data for identifying the other one of the plurality of information processing devices, in which the mixed voice data transmitting means transmits the mixed voice data based on the transfer destination identification data. In this manner, a voice uttered by a user on the transmitter side can be reproduced together with an environmental sound associated with a region corresponding to the user in a virtual space, in the information processing device on the receiver side designated by the transmitter side. Accordingly, it is possible to transmit a voice generated at a remote site in a virtual space to the receiver side with reality.

According to still another aspect of the present invention, the user voice mixing device is characterized by further including a position coordinate acquiring means for acquiring a position coordinate corresponding to the user in the virtual space, in which the region specifying means specifies a region corresponding to the user in the virtual space based on the position coordinate acquired by the position coordinate acquiring means. In this manner, a region corresponding to a user in a virtual space can be specified based on a position coordinate of the user in the virtual space. Then, a voice uttered by the user can be reproduced together with an environmental sound associated with the region corresponding to the user in the virtual space. Accordingly, it is possible to mix a voice generated at a remote site in a virtual space so as to make the voice realistic.

According to a still further aspect of the present invention, the user voice mixing device is characterized by further including a region identification data receiving means for receiving, from the one of the plurality of information processing devices, region identification data for identifying a region corresponding to the user in the virtual space, in which the region specifying means specifies a region corresponding to the user in the virtual space based on the received region identification data. In this manner, it is possible to specify a region corresponding to a user on the transmitter side in the virtual space by receiving a region specified by an information processing device on the transmitter side. Then, a voice uttered by the user on the transmitter side can be reproduced together with an environmental sound associated with the received region. Accordingly, it is possible to mix a voice generated at a remote site in a virtual space so as to make the voice realistic.

BRIEF DESCRIPTION OF THE DRAWINGS

FIG. 7 is a diagram illustrating a table in which region IDs in the virtual space and sound IDs are associated with one another.

BEST MODE FOR CARRYING OUT THE INVENTION

Hereinbelow, an embodiment of the present invention is described in detail with reference to the accompanying drawings.

Figure 1:
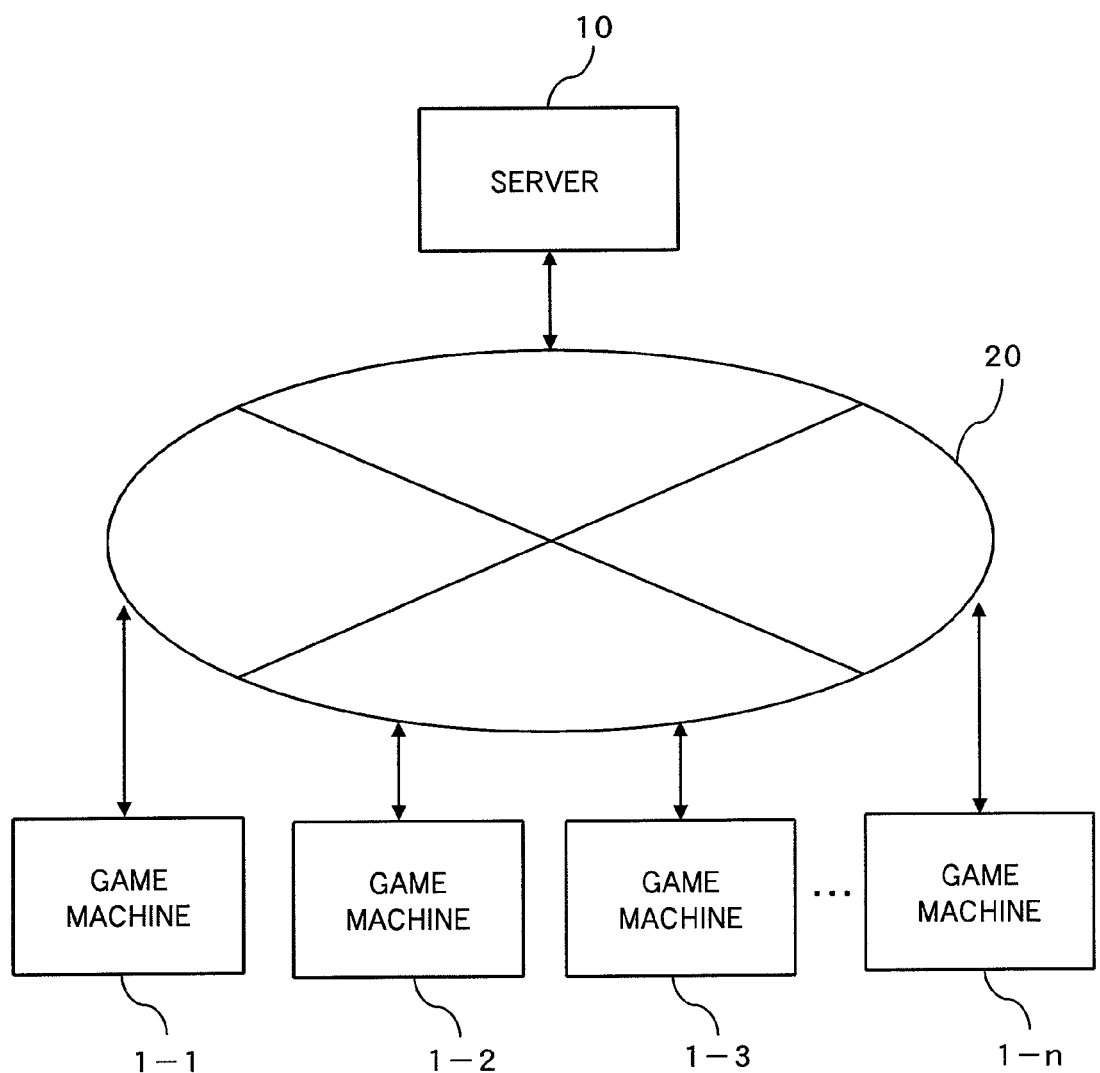
FIG. 1 is a structural diagram of a network game system to which a virtual space sharing system using a user voice mixing device according to an embodiment of the present invention is applied.

FIG. 1 is a structural diagram of a network game system to which a virtual space sharing system using a user voice mixing device according to the embodiment of the present invention is applied. As shown in the drawing, the network game system according to the embodiment of the present invention includes game machines 1-1 to 1-$n$ ($n$ is a natural number) and a server 10. The game machines 1-1 to 1-$n$ and the server 10 are connected to one another through a network 20 such as the Internet so as to be able to communicate with one another. In this embodiment, the user voice mixing device is applied to the server 10, but the game machine 1 may function as the user voice mixing device.

In the network game system according to this embodiment, a network game is executed in which a plurality of players can participate. In the network game, game characters corresponding to the players exist in the same virtual space, where the plurality of game characters compete against one another or cooperate with one another, to pursue the game. For this reason, the game machines 1-1 to 1-$n$ share a virtual space. Also, in the network game, the players can communicate with one another through voice chat. In this manner, a plurality of players can exchange information relating to the game and act with one another in a team, to thereby make the game more interesting.

The game machine 1 shown in FIG. 1 includes an information processing device constituting the network game system according to this embodiment, and executes a game in which the game machine 1 shares a virtual space with another game machine 1 which is capable of communicating with the game machine 1 through the network 20. It should be noted that in this description, matters common to all of the game machines 1-1 to 1-$n$ are described as a matter related to the game machine 1.

The game machine 1 has a controller (not shown) connected thereto. In executing a game, a player performs various instructing operations using the controller, to thereby move a position coordinate of the player in the virtual space and give various commands. Also, the game machine 1 has a display for displaying a game screen necessary for the player. For example, the display displays an image representing how the virtual space can be viewed from a viewpoint of the game character corresponding to the player of the game machine 1. Also, the game machine 1 may be an information processing device (computer) having a communication function, and includes a home-use game machine, a personal computer, a portable game machine, a mobile phone, or a personal digital assistant. The communication function is not limited to a wired communication function, and may include a radio communication function.

The server 10 shown in FIG. 1 is a server to which the user voice mixing device according to the embodiment of the present invention is applied. The server 10 is configured by using, for example, a well-known server computer system. The server 10 controls a network game by inputting/outputting various information into/from the game machines 1-1 to 1-$n$ which are communicably connected to the server 10 through the network 20. The server 10 receives, from each of the game machines 1, a position coordinate and a direction in the virtual space of a game character corresponding to a player of the game machine 1 and transmits position coordinates and directions of other game characters of other players to each of the game machines 1, so that the game machines 1-1 to 1-$n$ accessing the server 10 can share the virtual space. The virtual space is defined by a wide variety of objects such as a land and a building, and information on the objects is included in a game data in a game program. In the above-mentioned game, a player places a game character corresponding to the player in the virtual space provided by the server 10 and moves the game character virtually, to thereby enjoy the feeling as if the player were in the virtual space. The server 10 holds information necessary for communicating with the game machines 1 and game data or the like corresponding to the game machines 1, to thereby manage a multiplayer network game. Specifically, the server 10 manages network addresses (to serve as a DHCP server or the like), manages game data, manages time, and manages participation in and withdrawal from the game of the players of the game machines.

Figure 2:
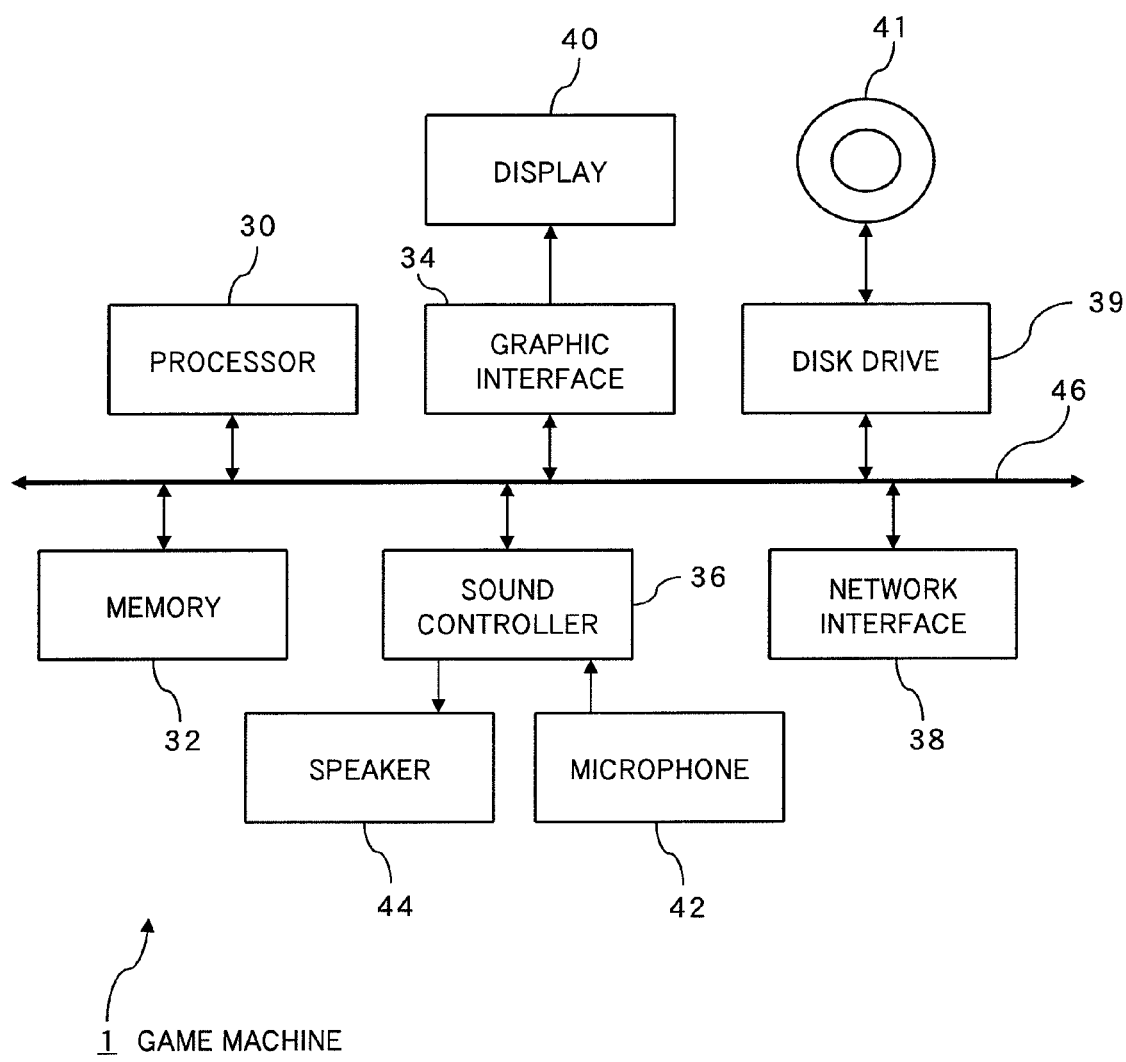
FIG. 2 is a hardware configuration diagram of a game machine.

FIG. 2 is a hardware configuration diagram of the game machine 1. The game machine 1 shown in the drawing includes a processor 30, a memory 32, a graphic interface 34, a sound controller 36, a network interface 38, and a disk drive 39, which are connected to one another through a bus 46 so as to be capable of performing data communications with one another. The game machine 1 uses the network interface 38 to exchange data with another game machine 1 or the server 10 through the network 20. The graphic interface 34 is connected to a display 40, and a game image is output through the display 40. The sound controller 36 receives an input of a voice of a game player through a microphone 42 and creates voice data representing the voice. Then, the voice data is transmitted to the server 10 or another game machine 1 through the network 20. Further, the sound controller 36 outputs a voice from a speaker 44 according to the voice data which has been received through the network 20 and temporarily stored in the memory 32 or the like. The disk drive 39 reads out data stored in a DVD-ROM 41, and transfers the data to the processor 30 or the memory 32.

In this embodiment, a game program or game data is stored in a computer-readable information storage medium such as a CD-ROM or a DVD-ROM, and the game program or the game data is read into the memory 32 as necessary. However, the game program or the game data downloaded from a remote site through the network 20 or another network may be stored in the memory 32.

The processor 30 controls each of the sections of the game machine 1 based on a game program read out from a DVD-ROM 41 or the memory 32 which is read by an operating system stored in a ROM (not shown) or the disk drive 39. The sections of the game machine 1 exchange addresses and data through the bus 46. The memory 32 has a game program or game data written therein as necessary, which are read out from the memory 32. The memory 32 is also used as a workspace for the processor 30. The graphic interface 34 includes a VRAM (Video Random Access Memory). The graphic interface 34 receives image data transmitted from the processor 30 to render a game screen on the VRAM, and displays the contents thereof on the display 40. The display 40 may include display means such as a CRT, a color LCD, a plasma display, a DLP projector, a built-in display, or a home television receiving set.

The sound controller 36 controls voice input through the microphone 42 and voice output to the speaker 44. The microphone 42 and the speaker 44 may be provided internally to a main body of the game machine 1, or may be provided to be externally connected to the game machine 1. In a case of using a home television receiving set as a display speaker, the speaker 44 may be a built-in speaker of the home television receiving set.

The network interface 38 is formed of a well-known NIC (Network Interface Controller), and includes a wireless interface or a radio interface.

Figure 3:
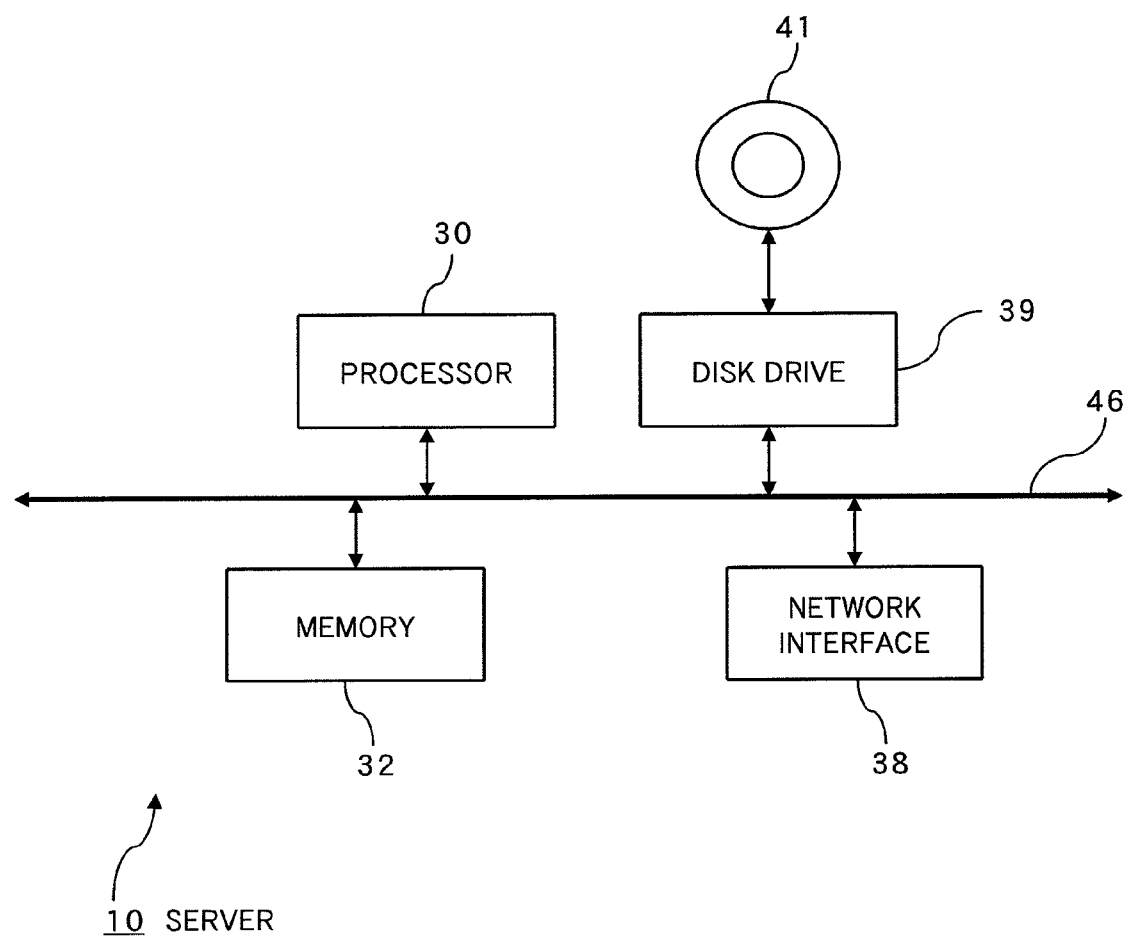
FIG. 3 is a hardware configuration diagram of a server.

FIG. 3 is a hardware configuration diagram of the server 10. The server 10 shown in the drawing includes the processor 30, the memory 32, the network interface 38, and the disk drive 39, which are connected to one another through the bus 46 so as to be capable of performing data communications with one another. For convenience of description, the hardware constituent elements of FIG. 3 equal to the hardware constituent element of the game machine 1 of FIG. 2 are denoted by the same reference numerals. The processor 30 controls each of the sections of the server 10 based on a game program read out from the DVD-ROM 41 or the memory 32 which are read by an operating system stored in a ROM (not shown) or the disk drive 39. The sections of the server 10 exchange addresses and data through the bus 46. The memory 32 has a game program or game data written therein as necessary, which are read out from the memory 32. The memory 32 is also used as a workspace for the processor 30. The disk drive 39 reads out data stored in the DVD-ROM 41 and transfers the data to the processor 30 or the memory 32.

Figure 4:
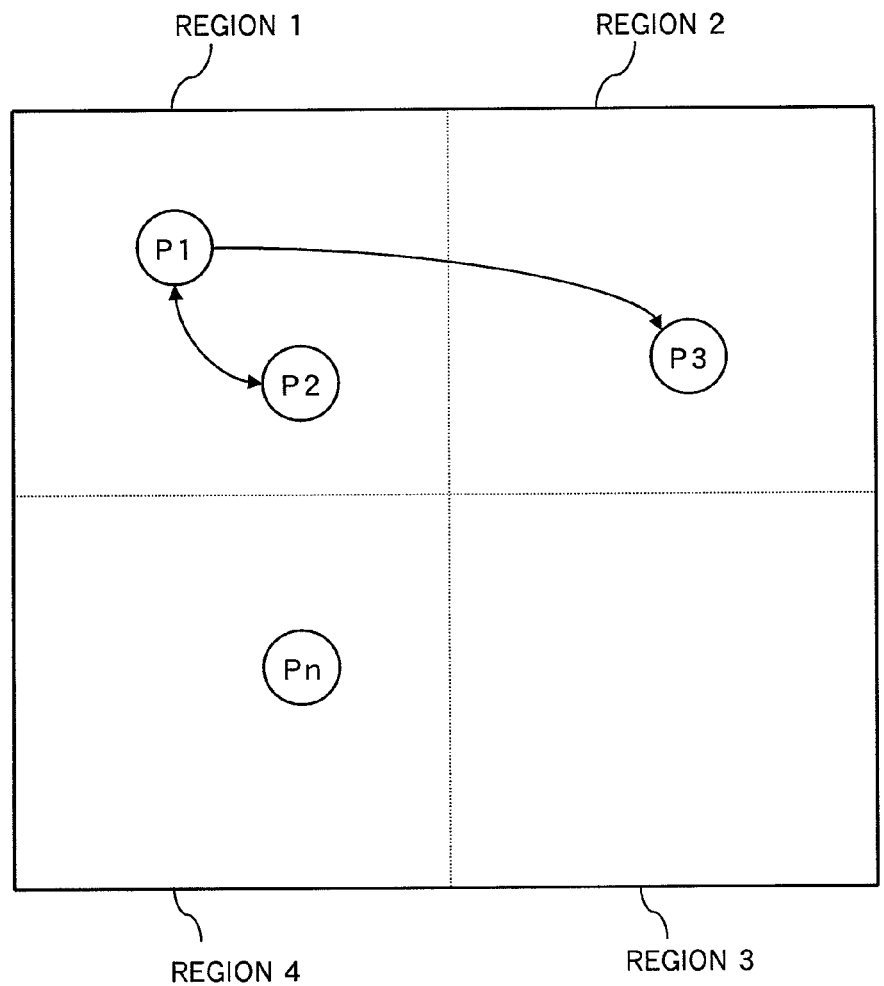
FIG. 4 is a diagram schematically showing how a virtual space is partitioned into regions in the network game according to the embodiment.

FIG. 4 is a diagram schematically showing how a virtual space is partitioned into regions in the network game according to this embodiment. In the drawing, there is assumed a case where game players have a voice chat with one another in the virtual space. The communications as described above allow each of the game players to find an opponent or an ally in a team competition, and to exchange information and interact with one another in various ways. As shown in the drawing, in one scene of the network game according to this embodiment, players (P1 to Pn) executing a game on the game machines thereof exist in the virtual space. In this embodiment, the regions defined by the dashed lines in the virtual space are obtained by dividing the virtual space into four equal regions. However, the virtual space may be divided in a different manner. For example, the regions may be obtained by dividing the virtual space with reference to, for example, the range of the coordinates in the virtual space, attributes of the surrounding environment (including a wide variety of objects such as a land and a building), and a distance from the position coordinate of the player.

In the above-mentioned network game, sound effects are generally produced for entertainment along with a scene or an action taken by the character. Examples of the sound effects include a sound of wind and a sound of a crash, which are used to make the game more realistic. In the game according to this embodiment, in a case where the player has uttered a voice at the same time as the above-mentioned sound effects are produced, the voice and the sound effects are mixed to be output. Specifically, for example, in a case of a scene of strong wind, the sound of the wind overlaps the voice of the player. In this case, the sound of the wind and the voice of the player are mixed based on a rule that the sound of the wind is largely weighted such that the voice of the character is drowned out by the sound of the wind, and becomes hard to hear. The voice may be mixed based on a rule to produce a voice that is heard in a way similar to that in the actual world, or a rule to produce a voice that is heard in an unrealistic way which is characteristic to the virtual world.

Here, as shown FIG. 4, a case where P1 has a chat with P2 and P1 has a chat with P3 is described below. In the voice chat performed between P1 and P2, the environmental sound for P1 and P2 may be the same because P1 and P2 are in the same region. On the other hand, as shown in the drawing, in a case where P1 and P3 exist at sites distant from each other and P1 has a voice chat with P3 through a transceiver, one or more environmental sounds are mixed in the voice chat. In other words, in order to make the above-mentioned voice chat performed between P1 and P3 through the transceiver more realistic, it is necessary that P3 hears a sound obtained by mixing the environmental sound of P1 and the environmental sound of P3. Accordingly, in the case of a voice chat performed between remote sites in the virtual space, it is necessary to convey the environmental sounds from one side to the other side and vice versa in order to make it more realistic. However, transmitting the environmental sound itself through a network increases a network load, and therefore is not desirable in a multiplayer network game. For this reason, according to the network system of the present invention, the environmental sound itself is not transmitted through the network, while the environmental sound is associated with region information of a game player in the virtual space so as to specify an environmental sound of each of the game players, to thereby reduce the network load.

Figure 5:
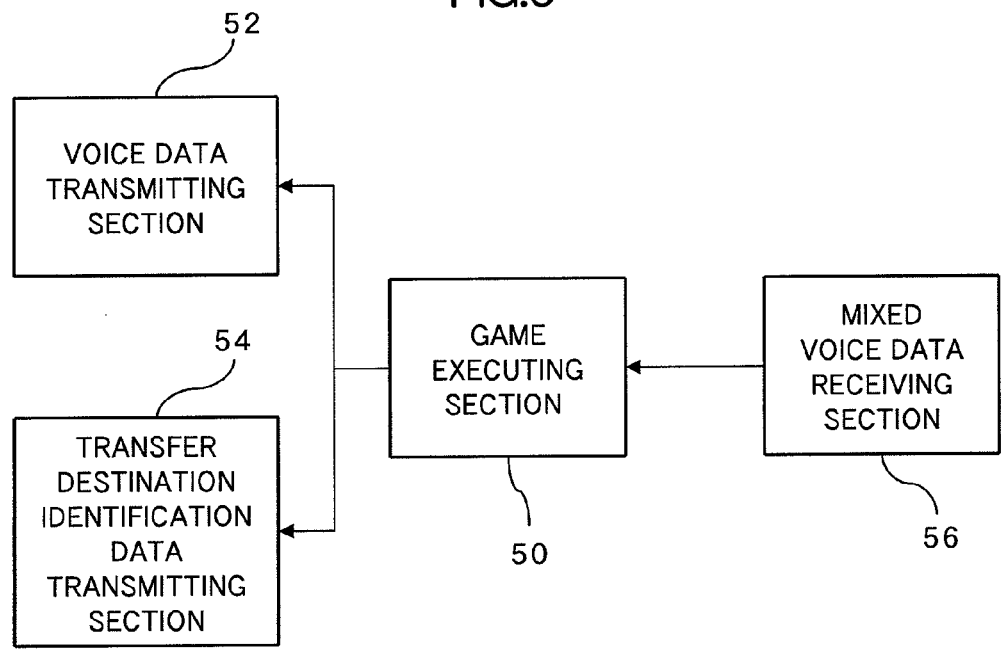
FIG. 5 is a functional block diagram of a game machine.

In order to implement the above-mentioned processing, functions that should be provided to the game machine 1 and the server 10 are described below. First, a functional block diagram of the game machine 1 is shown in FIG. 5. As shown in the drawing, the game machine 1 includes a game executing section 50, a voice data transmitting section 52, a transfer destination identification data transmitting section 54, and a mixed voice data receiving section 56.

The game executing section 50 executes a game based on a network game program. Specifically, the game executing section 50 is implemented as described below by using the hardware of the game machine 1. The game machine 1 receives an operational input from a controller of the player, and transmits information representing game data or an instruction given by the player to the server 10 through a network. Next, the game machine 1 receives, through the network, data processed in the server 10, such as game data including information on the virtual space, positions of other players, or an occurrence of an event. Then, the processor 30 processes the game program based on the received information and game data held by the processor 30, and displays, on the display 40, an image drawn by the graphic interface 34 for illustrating a part of the virtual space viewed from a viewpoint of the user.

The voice data transmitting section 52 transmits voice data representing a voice uttered by a player operating the game machine 1, to the server 10 through the network. The voice data transmitting section 52 is implemented as described below by using the hardware of the game machine 1. The sound controller 36 converts a voice uttered by the player to be input through the microphone 42 into digital voice data. Then, the processor 30 transmits the digital voice data to the server 10 through the network interface 38.

The transfer destination identification data transmitting section 54 transmits, to the server 10, identification information representing a final transmission destination of the voice data transmitted by the voice data transmitting section 52. The identification information includes an address of the transfer destination, an identifier on the network game system, or an identifier corresponding to a player in the game, but is not limited thereto as long as the identification information includes information capable of identifying a game machine 1 or a player thereof of transfer destination.

The mixed voice data receiving section 56 receives mixed voice data transmitted from the server 10. The mixed voice data includes voice data mixed in the server, which is described later in detail. The mixed voice data receiving section 56 is configured by including the network interface 38.

Figure 6:
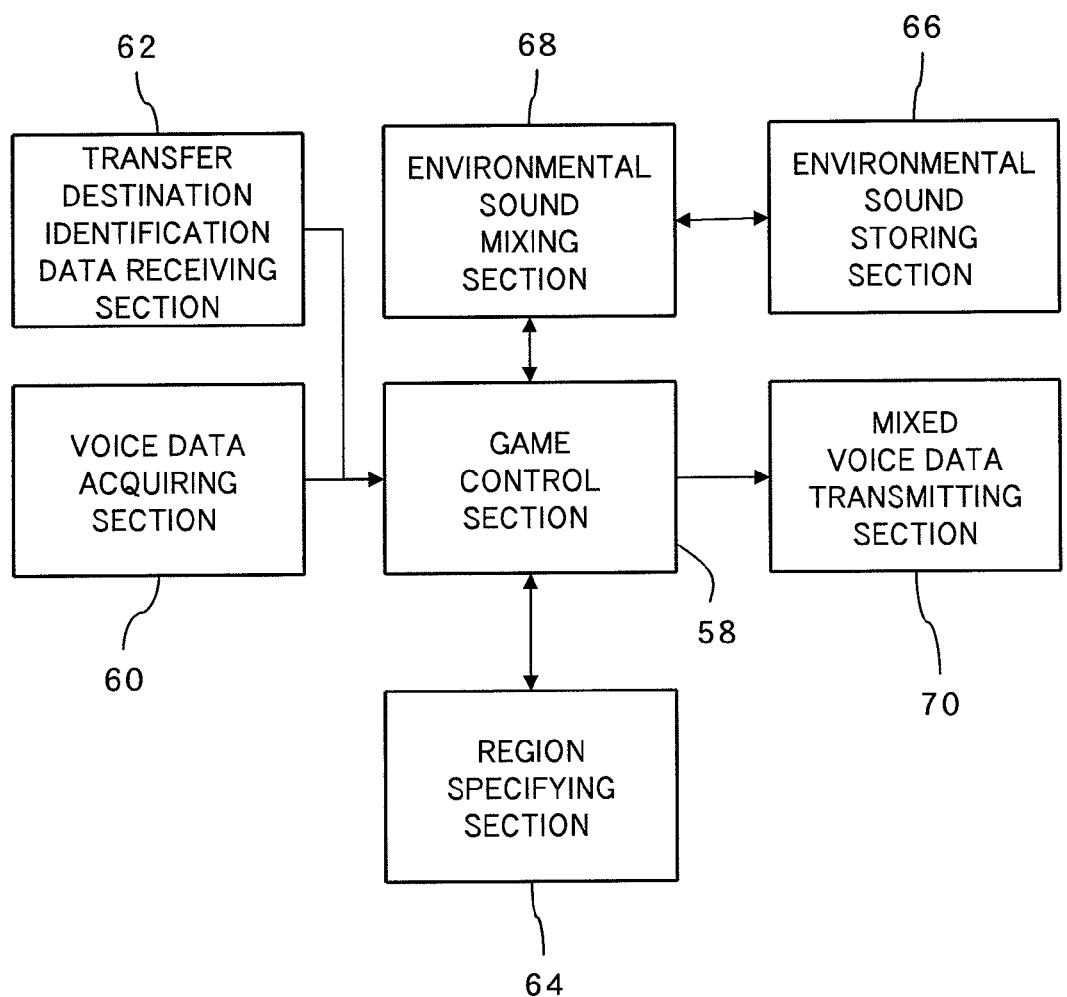
FIG. 6 is a functional block diagram of a server.

Next, a functional block diagram of the server 10 is shown in FIG. 6. As shown in the drawing, the server 10 includes a game control section 58, a voice data acquiring section 60, a transfer destination identification data receiving section 62, a region specifying section 64, an environmental sound storing section 66, an environmental sound mixing section 68, and a mixed voice data transmitting section 70.

The game control section 58 controls an entire network game by performing various inputs and outputs with respect to the game machines 1 connected to the network game system. The game control section 58 includes a position coordinate acquiring section (not shown) for acquiring position coordinates of game characters corresponding to the players of the game machines 1, in the virtual space. The game control section 58 is implemented by the processor 30 of the server 10, which controls each of the sections of the server 10 based on a game program and game data stored in the DVD-ROM 41 which are read out through the disk drive 39. Also, the above-mentioned position coordinate acquiring section is implemented as described below by using the hardware of the server 10. The server 10 stores, in the memory 32, a table storing position coordinates of the game players in the virtual space in association with identification information of the game players. Then, when a signal is transmitted from the game machine 1 indicating that the position of the player has changed, the processor 30 acquires a position coordinate of the player corresponding to the game machine 1 as a transmission source of the signal from the table, and updates a value of the position coordinate of the player in the table according to a moving amount indicated by the received signal.

The voice data acquiring section 60 acquires voice data transmitted from the game machine 1. Specifically, the voice data acquiring section 60 receives voice data transmitted from the voice data transmitting section 52 of the game machine 1 so as to acquire the voice data, and is configured by including the network interface 38.

The transfer destination identification data receiving section 62 receives data for identifying a game machine 1 as a final destination for transmitting the received voice data. The transfer destination identification data receiving section 62 receives transfer destination identification data transmitted from the transfer destination identification data transmitting section 54 of the game machine 1, and is configured by including the network interface 38.

The region specifying section 64 specifies a region corresponding to a game player in the virtual space. Specifically, the region specifying section 64 is implemented as described below by using the hardware of the game machine 1. The server 10 reads out, through the disk drive 39, a correspondence table including a range of position coordinates in the virtual space and region information which are associated with each other, and stores the correspondence table in the memory 32. The correspondence table corresponds to game data included in the DVD-ROM 41. Then, the processor 30 compares the position coordinate of the game player in the virtual space stored in the memory 32 with the above-mentioned table, to thereby specify a region at which the player is located in the virtual space. In this embodiment, the server 10 includes the region specifying section 64, but the game machines 1 may each include the region specifying section 64. In this case, a region of the game player specified by each of the game machines 1 may be received and acquired by the server 10.

Figure 7:
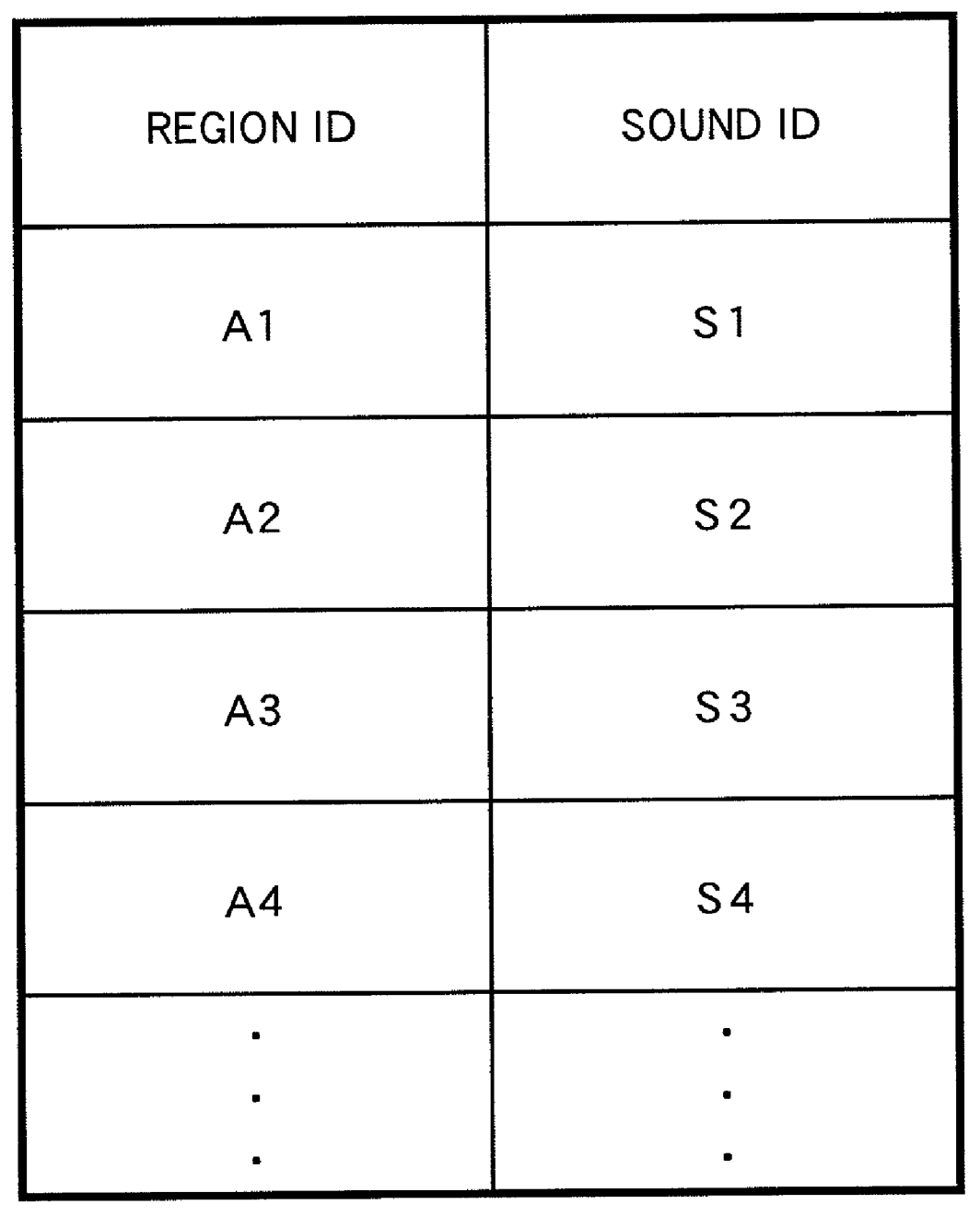

The environmental sound storing section 66 stores an environmental sound in association with each of the one or more regions defined in the virtual space. Specifically, the environmental sound storing section 66 holds a table in which regions in the virtual space and sound information are associated with each other. In the above-mentioned table, region IDs in the virtual space are associated with sound IDs as shown in FIG. 7. The above-mentioned table may be included in the game data stored in the DVD-ROM 41. The region ID in the drawing includes information for identifying a region in the virtual space, and corresponds to a region specified by the region specifying section 64. The sound information may include information for designating a sound ID as in this embodiment, or may include information for directly designating a sound file. The server 10 stores the above-mentioned table, so as to acquire an environmental sound to be mixed by specifying a region of each of the players, without having the game machines 1 transmit and receive the environmental sound itself.

The environmental sound mixing section 68 acquires, from the environmental sound storing section 66, an environmental sound associated with a region specified by the region specifying section 64, and mixes the acquired environmental sound and the voice data received by the voice data acquiring section 60 at a predetermined mixing ratio, to thereby create mixed voice data. Specifically, the environmental sound mixing section 68 is implemented as described below by using the hardware of the server 10. The processor 30 refers to the memory 32 (environmental sound storing section 66) based on a region of a player as a transmission source of voice data and a region of a player as a transfer destination corresponding to the received transfer identification data, to thereby acquire an environmental sound around the player at the transmission source of the voice data and an environmental sound around the player at the transfer destination. Then, the environmental sound mixing section 68 mixes two of the environmental sounds and the voice data items acquired from the voice data transmission source and the transfer destination as described above, at a predetermined mixing ratio, to thereby create mixed voice data. In this case, the predetermined mixing rate may be varied in accordance with a distance between a predetermined representative position of a region in the virtual space and a position coordinate of a user in the virtual space.

The mixed voice data transmitting section 70 transmits mixed voice data mixed in the environmental sound mixing section 68, to the game machine 1 corresponding to the transfer destination identification data. Specifically, the mixed voice data transmitting section 70 is implemented as described below by using the hardware of the server 10. The processor 30 refers to the memory 32 based on the received transfer destination identification data, to thereby acquire address information of the game machine 1 corresponding to the transfer destination. Then, the processor 30 transmits the mixed voice data to the acquired address through the network interface 38. The game machine 1, which has received the mixed voice data transmitted from the mixed voice data transmitting section 70, outputs the mixed voice through the speaker 44.

Hereinbelow, an operation of the game machine according to this embodiment is described in detail.

Figure 8:
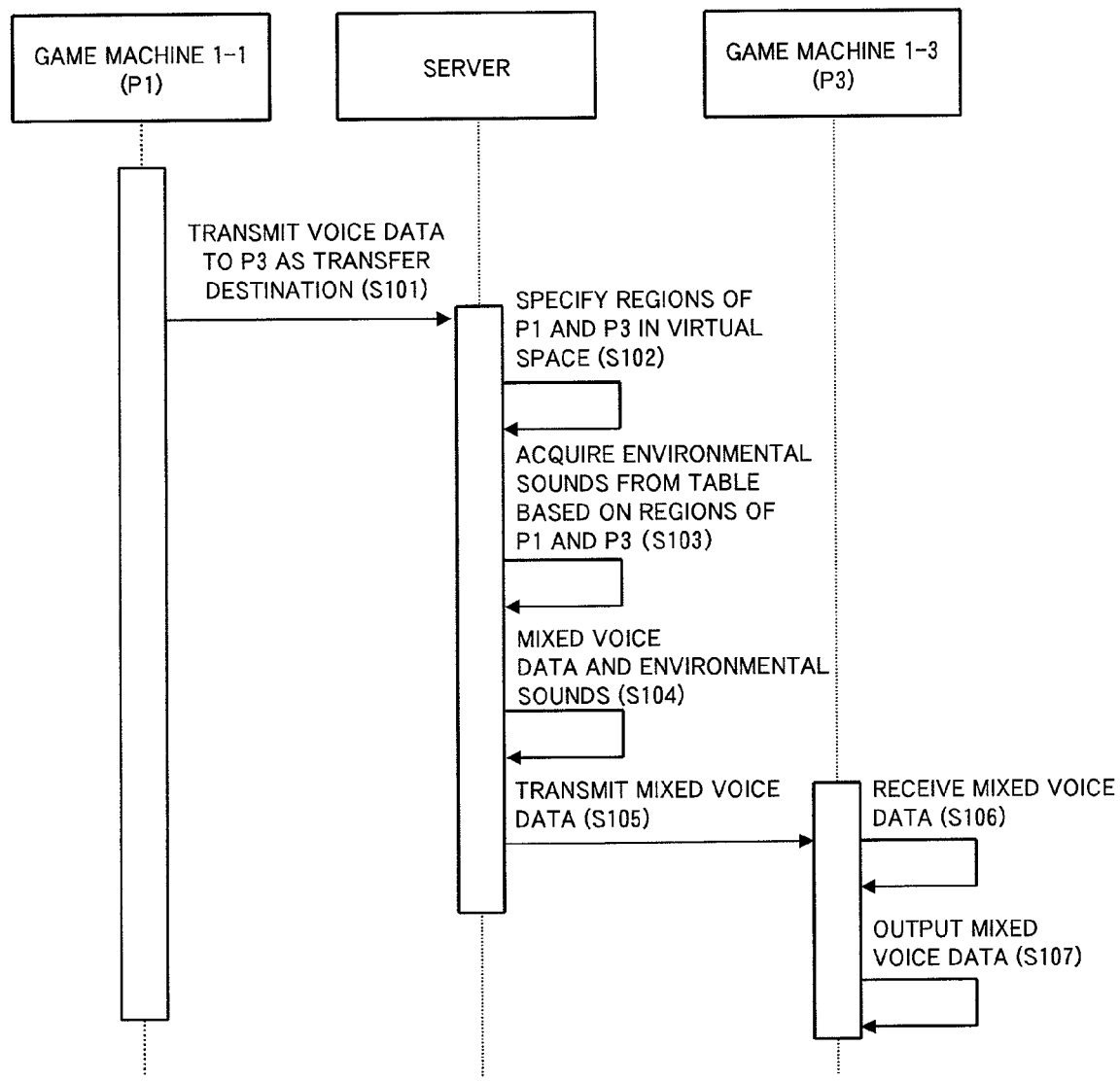
FIG. 8 is a sequence diagram illustrating how voice data is transmitted between game machines according to the embodiment of the present invention.

FIG. 8 is a sequence diagram illustrating how voice data is transmitted between the game machines according to this embodiment. The drawing illustrates a case where the game machine 1-1 (P1) makes a remote site call to the game machine 1-3 (P3) in the virtual space through a transceiver or the like. In this case, P1 is playing a game with the game machine 1-1 and P3 is playing a game with the game machine 1-3. The game machine 1-1 transmits voice data representing a voice uttered by P1, to the server 10 (S101). At this time, the game machine 1-1 transmits the voice data by designating P3 as the transfer destination of the voice data. The server 10, which has received the voice data, specifies regions in the virtual space in which P1 and P3 are located, based on the position coordinates of P1 and P3 (S102). Then, the server 10 refers to the table stored in the environmental sound storing section 66 in which regions and environmental sounds are associated with one another, based on the regions specified for P1 and P3, so as to acquire an environmental sound for P1 and an environmental sound for P3 (S103), and mixes the environmental sounds and the voice data at a predetermined mixing ratio (S104), to thereby create mixed voice data. Then, the server 10 transmits the mixed voice data to the game machine 1-3 (S105). The game machine 1-3 receives the mixed voice data from the server 10 (S106), and outputs the received mixed voice data to the game player through the speaker 44 (S107).

Next, a second embodiment of the present invention is described below. According to the second embodiment of the present invention, the game machine 1 mixes a voice received from another game machine 1.

Figure 9:
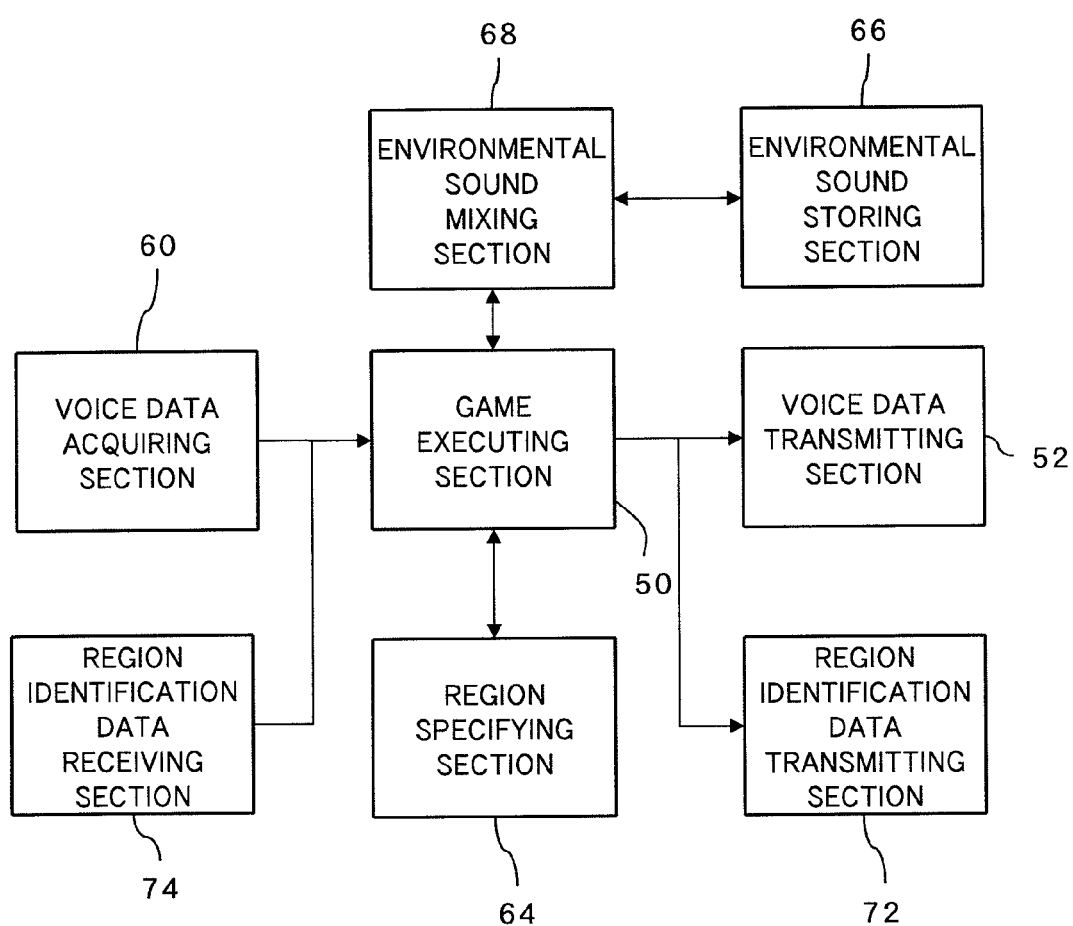
FIG. 9 is a functional block diagram of a game machine according to a second embodiment of the present invention.

FIG. 9 is a functional block diagram of the game machine 1 according to the second embodiment of the present invention. The game machine 1 according to the second embodiment of the present invention is provided with a function on a transmitting side as well as a function on a receiving side of voice data. As shown in the drawing, the game machine 1 functionally includes the game executing section 50, the voice data transmitting section 52, the voice data acquiring section 60, the region specifying section 64, an environmental sound storing section 66, an environmental sound mixing section 68, a region identification data transmitting section 72, and a region identification data receiving section 74. In the drawing, the functional blocks denoted by the same reference numerals as the first embodiment have functions similar to those of the first embodiment, and therefore descriptions thereof are omitted. Hereinbelow, the region identification data transmitting section 72 and the region identification data receiving section 74 are described.

The region identification data transmitting section 72 transmits region identification data for identifying a region corresponding to a user in the virtual space, which is specified by the region specifying section 64. The region identification data includes data for allowing the transmitting side of voice data to transmit a region specified by the region specifying section 64 to the receiving side of voice data, and may include information for uniquely defining a region in the virtual space. The region identification data transmitting section 72 is configured by including the network interface 38.

The region identification data receiving section 74 receives region identification data for identifying a region corresponding to a user of a game machine 1 as a transmission source of voice data in the virtual space. The region identification data receiving section 74 receives the region identification data transmitted from the region identification data transmitting section 72 of the game machine 1 as the transmission source of voice data, and is configured by including the network interface 38.

Figure 10:
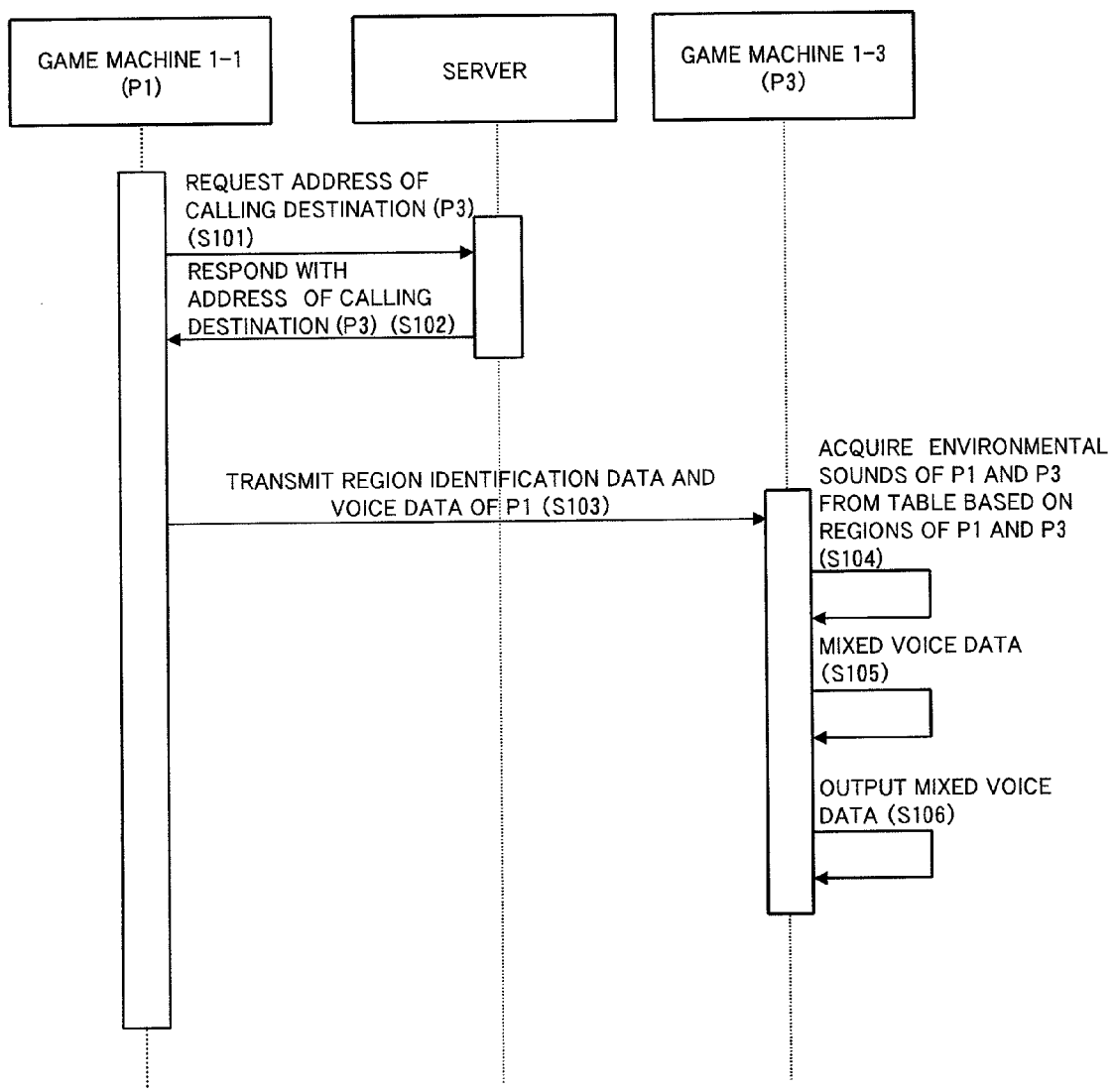
FIG. 10 is a sequence diagram illustrating how voice data is transmitted between game machines according to the second embodiment of the present invention.

FIG. 10 is a sequence diagram illustrating how voice data is transmitted between game machines 1 according to the second embodiment of the present invention. The drawing illustrates a case where the game machine 1-1 (P1) makes a remote site call to the game machine 1-3 (P3) in the virtual space through a transceiver or the like. The game machine 1-1 requests an address (such as an IP address) of the game machine 1-3 as a transmission source of a voice, from the server 10 of an address (S101), and receives a response from the server 10 (S102). Then, the game machine 1-1 transmits region identification data and voice data of P1 to the received address of the game machine 1-3 (S103). The game machine 1-3 acquires an environmental sound of P1 and an environmental sound of P3 (S104) from the environmental sound storing section 66 in which regions and environmental sounds are associated with one another, based on a region corresponding to the region identification data of P1 and a region of P3. Then, the game machine 1-3 mixes those environmental sounds and the voice data at a predetermined mixing ratio (S105), and outputs the mixed voice to the game player through a speaker (S106).

With the user voice mixing device according to the embodiments of the present invention as described above, it is possible to mix a voice generated at a remote site in a virtual space so as to make the voice more realistic, without increasing a network load.

It should be noted that the present invention is not limited to the above-mentioned embodiments.

For example, in the above-mentioned embodiments, the transmission source of voice data corresponds to the reception destination of voice data one by one, but the correspondence is not limited thereto. For example, a plurality of game machines for receiving voice data may be provided.

The invention claimed is:

1. A user voice mixing device used in a virtual space sharing system in which a plurality of information processing devices share a virtual space, said user voice mixing device comprising:

means for receiving voice data representing a voice uttered by a first user of one of the plurality of information processing devices and a first region corresponding to a first position coordinate of the first the user in the virtual space;

means for storing predetermined environmental sounds in association with each of one or more regions defined in the virtual space;

means for acquiring a second position corresponding to a second user in the virtual space, who receives the voice data of the first at the user voice mixing device;

means for specifying a second region corresponding to the second user according to the second acquired position coordinate, the second region being different from the first region;

means for creating mixed voice data by acquiring a first predetermined environmental sound associated with the first region received by the means for receiving from the means for storing, and mixing the acquired first predetermined environmental sound and the voice data, and acquiring a second predetermined environmental sound associated with the second region corresponding to the second user, and mixing the voice data with the first predetermined environmental sound associated with the first region corresponding to the user and the second predetermined environmental sound associated with the second region corresponding to the second user; and means for outputting the mixed voice data, wherein said acquired first environmental sound is independent of the voice data and not directly associated with the acquired position coordinate of the user, and wherein, when said voice data, said first environmental sound and said second environmental sound occur at a same time, said voice data is mixed with said first and second environmental sounds to generate a modified output indicative of said first and second environmental sounds reducing the comprehensibility of said voice data.

2. A user voice mixing device according to claim 1, wherein:

the user voice mixing device is communicably connected to the plurality of information processing devices through a communication network;

the means for acquiring receives the voice data from the one of the plurality of information processing devices;

the means for transmitting transmits the mixed voice data to another one of the plurality of information processing devices; and the other one of the plurality of information processing devices receives the mixed voice data and outputs the mixed voice data.

3. A user voice mixing device according to claim 2, further comprising means for receiving, from the one of the plurality of information processing devices, transfer destination identification data for identifying the other one of the plurality of information processing devices, wherein the means for transmitting the mixed voice data transmits the mixed voice data based on the transfer destination identification data.

4. A user voice mixing device according to any one of claims 1 to 3, further comprising means for receiving, from the one of the plurality of information processing devices, region identification data for identifying a region corresponding to the user in the virtual space, wherein
the means for specifying specifies a region corresponding to the user in the virtual space based on the received region identification data.

5. The user voice mixing device of claim 1, further comprising a correlation table that provides a correlation between respective ones of said region and ones of said environmental sound.

6. The user voice mixing device of claim 1, wherein the predetermined environmental sounds are sound effects corresponding to a scene in a game.

7. The user voice mixing device of claim 1, wherein the predetermined environmental sounds are different from voice uttered by other users of the plurality of information processing devices.

8. A control method for a computer used in a virtual space sharing system in which a plurality of information processing devices share a virtual space, the control method for a computer comprising:
acquiring voice data representing a voice uttered by a user of one of the plurality of information processing devices;
acquiring a first position coordinate corresponding to the user in the virtual space and acquiring a second position coordinate corresponding to a receiver of the voice data in the virtual space;
specifying a first region corresponding to the user in the virtual space according to the first acquired position coordinate, and specifying a second region corresponding to the receiver of the voice data according to the second acquired position coordinate, second region being different from the first region;
transmitting the first region and the voice data to the receiver;
creating mixed voice data at the receiver by acquiring, with reference to storing predetermined environmental sounds in association with each of one or more regions defined in the virtual space, a first predetermined environmental sound associated with the first region specified in the specifying, and mixing the acquired first predetermined environmental sound and the voice data, and acquiring a second predetermined environmental sound associated with the second region corresponding to the receiver, and mixing the voice data with the first predetermined environmental sound associated with the first region corresponding to the user and the second predetermined environmental sound associated with the second region corresponding to the receiver; and
outputting the mixed voice data at the receiver,
wherein said acquired first environmental sound is independent of the voice data and not directly associated with the acquired position coordinate of the user, and
wherein, when said voice data, said first environmental sound and said second environmental sound occur at a same time, said voice data is mixed with said first and second environmental sounds to generate a modified output indicative of said first and second environmental sounds reducing the comprehensibility of said voice data.

9. The control method of claim 8, further comprising a correlation table that performs correlation between respective ones of said region and ones of said environmental sound.

10. The control method of claim 8, wherein the predetermined environmental sounds are sound effects corresponding to a scene in a game.

11. The control method of claim 8, wherein the predetermined environmental sounds are different from voice uttered by other users of the plurality of information processing devices.

12. A non-transitory information storage medium storing a program for causing a computer to function, the computer being used in a virtual space sharing system in which a plurality of information processing devices share a virtual space, the program causing the computer to function as:
means for acquiring voice data representing a voice uttered by a user of one of the plurality of information processing devices;
means for storing predetermined environmental sounds in association with each of one or more regions defined in the virtual space;
means for acquiring a first position coordinate corresponding to the user in the virtual space and acquiring a second position coordinate corresponding to a receiver of the voice data in the virtual space;
means for specifying a first region corresponding to the user in the virtual space according to the first acquired position coordinate, and specifying a second region corresponding to the receiver of the voice data according to the second acquired position coordinate, second region being different from the first region;
transmitting the first region and the voice data to the receiver;
means for creating mixed voice data at the receiver by acquiring a first predetermined environmental sound associated with the first region specified by the means for specifying from the environmental sound storing means, and mixing the acquired first predetermined environmental sound and the voice data, and acquiring a second predetermined environmental sound associated with the second region corresponding to the receiver, and mixing the voice data with the first predetermined environmental sound associated with the first region corresponding to the user and the second predetermined environmental sound associated with the second region corresponding to the receiver; and
means for outputting the mixed voice data at the receiver,
wherein said acquired first environmental sound is independent of the voice data and not directly associated with the acquired position coordinate of the user, and
wherein, when said voice data, said first environmental sound and said second environmental sound occur at a same time, said voice data is mixed with said first and second environmental sounds to generate a modified output indicative of said first and second environmental sounds reducing the comprehensibility of said voice data.

13. The non-transitory information storage medium of claim 12, further comprising a correlation table that provides a correlation between respective ones of said region and ones of said environmental sound.

14. The non-transitory information storage medium of claim 12, wherein the predetermined environmental sounds are sound effects corresponding to a scene in a game.

15. The non-transitory information storage medium of claim 12, wherein the predetermined environmental sounds are different from voice uttered by other users of the plurality of information processing devices.

16. A virtual space sharing system in which a plurality of information processing devices share a virtual space, comprising:

means for acquiring voice data representing a voice uttered by a user of one of the plurality of information processing devices;

means for storing predetermined environmental sounds in association with each of one or more regions defined in the virtual space;

means for acquiring a first position coordinate corresponding to the user in the virtual space and acquiring a second position coordinate corresponding to a receiver of the voice data in the virtual space;

means for specifying a first region corresponding to the user in the virtual space according to the first acquired position coordinate, and specifying a second region corresponding to the receiver of the voice data according to the second acquired position coordinate, the second region being different from the first region;

means for transmitting the first region and the voice data to the receiver;

means for creating mixed voice data at the receiver by acquiring a first predetermined environmental sound associated with the first region specified by the means for specifying from the means for storing, and mixing the acquired first predetermined environmental sound and the voice data, and acquiring a second predetermined environmental sound associated with the second region corresponding to the receiver, and mixing the voice data with the first predetermined environmental sound associated with the first region corresponding to the user and the second predetermined environmental sound associated with the second region corresponding to the receiver, and means for outputting the mixed voice data at the receiver;

wherein said acquired first environmental sound is independent of the voice data and not directly associated with the acquired position coordinate of the user, and wherein, when said voice data, said first environmental sound and said second environmental sound occur at a same time, said voice data is mixed with said first and second environmental sounds to generate a modified output indicative of said first and second environmental sounds reducing the comprehensibility of said voice data.

17. The virtual space sharing system of claim 16, further comprising a correlation table that provides a correlation between respective ones of said region and ones of said environmental sound.

18. The virtual space sharing system of claim 16, wherein the predetermined environmental sounds are sound effects corresponding to a scene in a game.

19. The virtual space sharing system of claim 16, wherein the predetermined environmental sounds are different from voice uttered by other users of the plurality of information processing devices.

* * * * *